UNITED STATES PATENT OFFICE.

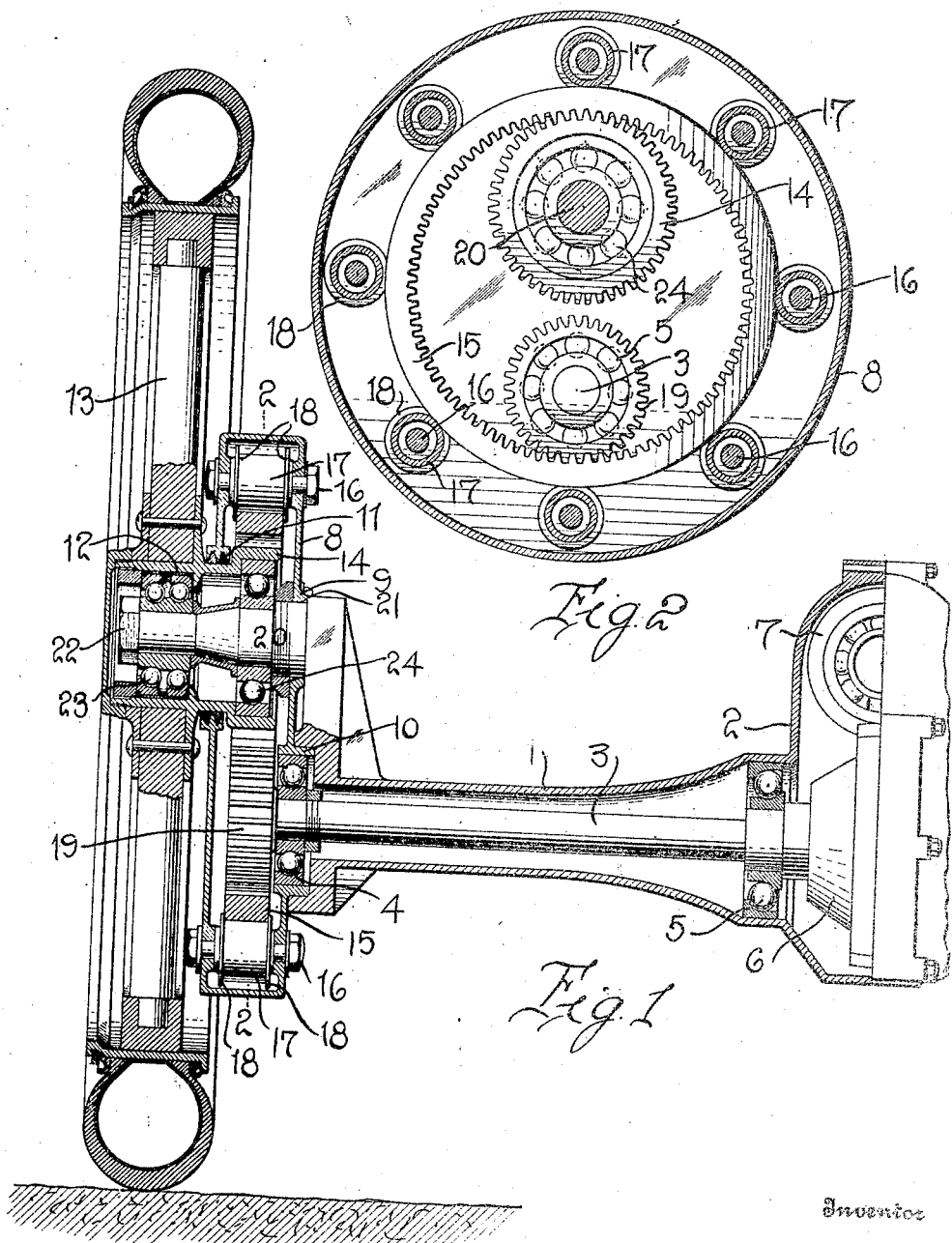
FLOYD FITZ-TARR BINGHAM.

FLOYD FITZ-TARR BINGHAM, OF SAN JOSE, CALIFORNIA.

DRIVE MECHANISM.

1,192,376.  Specification of Letters Patent.  Patented July 25, 1916.

Application filed January 11, 1916. Serial No. 71,545.

*To all whom it may concern:*

Be it known that I, FLOYD FITZ-TARR BINGHAM, of San Jose, in the county of Santa Clara and State of California, have invented certain new and useful Improvements in Drive Mechanism; and I do hereby declare the following to be a full, clear, and exact description of the invention, such as will enable others skilled in the art to which it appertains to make and use the same.

In automobiles designed for heavy commercial use, or for other purposes where it is desirable to employ wheels beyond the usual size, it is desirable that the frame of the vehicle should not be elevated above the usual level for the purpose of readiness in unloading and also to permit the body to be changed. At the same time by having the weight of the vehicle positioned below the center of the wheels increased stability will be obtained.

My invention relates to a rear axle equipment for motor vehicles which incorporates the desirable features above noted.

The object of my invention is to provide an improved drive mechanism adapted for efficient usage with these driving wheels of increased diameter, and which is constructed particularly to permit the employment of these large wheels without necessitating a corresponding elevation of the center of gravity of the car.

A further object of my invention is to provide an improved drive mechanism which will be thoroughly protected against external injury and the entrance of dust or moisture, and in which a lubricant will be effectually maintained and automatically distributed to the wearing surfaces.

Referring to the accompanying drawings: Figure 1 is a transverse vertical sectional view of a traction wheel and a portion of the rear drive axle, embodying features of the invention; Fig. 2 is a longitudinal vertical sectional view taken on line 2—2 of Fig. 1.

In the drawing, 1 indicates a hollow supporting axle extending from a differential gear casing 2, and constituting a part of the running gear for supporting the rear body springs (not shown), a drive shaft 3 being journaled at 4 and 5 coaxially within the hollow axle 1 and operatively connected to any usual differential gear 6 in the casing 2. The differential 6 may be driven by any suitable means but is preferably actuated by a spiral gear 7.

Oil-tight annular casings 8 are shown provided with bosses 9 and 10 for rigidly securing them on the ends of the hollow axle 1, and these casings are also provided on their outer sides with apertures 11 in which are rotatably mounted the hubs 12 of the driving wheels 13. The hubs 12 of the driving wheels are provided inside the casings 8 with integral gears 14, which mesh with large internal toothed gears 15. Mounted concentrically with the inner annular surfaces of the casings 8, on bolts 16, are a plurality of freely rotatable rollers 17 between the rim flanges 18 of which move the peripheries of the large gears 15. These large gears 15 are rotated by means of gears 19, which are rigidly mounted within the casings 8 on the ends of the drive shaft 3, and these gears 15 are adapted to actuate the gears 14 on the hubs 12.

Stub axles 20 are rigidly mounted at 21 in the casings 8 and extend coaxially through the hubs 12; the free outer ends of said stub axles 20 being connected, as by nuts 22, to the wheel bearings 23. The hubs 12 are thus rotatably supported at their inner ends by the bearings 24, and at their outer ends by the bearings 23, thereby providing a very efficient drive connection operating with a minimum of friction.

From the foregoing, it will be apparent that my invention provides an improved construction, in which the gears 15 and 19 can be formed of suitable size to position the center of gravity of the car as low as desired irrespective of the size of the driving wheels employed; and that the relative proportions of the gears 15 and 19 can be readily designed to provide any required speed change in the drive mechanism.

My invention provides an improved construction, in which the entire weight of the car is firmly carried on the running gear, thereby relieving the drive mechanism from all load; thus providing a construction operating at high efficiency with a minimum of strain and friction.

Obviously the design and details of construction may be varied without departing from the spirit of the invention and I therefore do not limit myself to the exact construction shown.

What I claim and desire to secure by Letters Patent is:

1. In a motor car, the combination with a hollow supporting axle, a shaft journaled therein, a casing extending upwardly from the end of said axle and provided above the same with a stub axle, a driving wheel having a hub journaled on said axle, a gear provided upon said hub, an internally toothed gear rotatably mounted in said casing and engaging said hub gear, and a gear provided upon the end of said shaft for also engaging said internally toothed gear.

2. In a motor car, the combination with a hollow supporting axle, a shaft journaled therein, a casing extending upwardly from the end of said axle and provided above same with a stub axle, a driving wheel having the hub which is journaled on said axle, a gear provided upon said hub, an internally toothed gear rotatably mounted in said casing and engaging said hub gear, and a gear provided upon the end of said shaft for also engaging said internally toothed gear, said hub gear and shaft gear being in vertical alinement.

3. In a motor car, the combination with a hollow supporting axle, a shaft journaled therein, a casing extending upwardly from the end of said axle and provided also above the same with a stub axle, a driving wheel having a hub journaled on said axle, a gear provided upon said hub, a plurality of freely rotatable rollers mounted in said casing, an internally toothed gear having its periphery engaging said rollers, said hub gear engaging said internally toothed gear, and a gear provided upon the end of said shaft and engaging said internally toothed gear.

4. In a motor car, the combination with a hollow supporting axle, a shaft journaled therein, a casing extending upwardly from the end of said axle and provided above same with a stub axle, a driving wheel having a hub journaled on said axle, a gear provided upon said hub, a plurality of freely rotatable rollers mounted in said casing, an internally toothed gear having its periphery engaging said rollers, a hub gear engaging said internally toothed gear above said shaft, and a gear provided upon the end of said shaft and engaging said internally toothed gear below the shaft, substantially as described.

In testimony whereof, I have signed this specification in the presence of two subscribing witnesses.

FLOYD FITZ-TARR BINGHAM.

Witnesses:
  KATH. T. BINGHAM,
  EDW. G. STERLING.